United States Patent
Wedig et al.

(10) Patent No.: US 11,105,212 B2
(45) Date of Patent: Aug. 31, 2021

(54) GAS TURBINE ENGINES INCLUDING TANGENTIAL ON-BOARD INJECTORS AND METHODS FOR MANUFACTURING THE SAME

(71) Applicant: HONEYWELL INTERNATIONAL INC., Morris Plains, NJ (US)

(72) Inventors: Michael Ryan Wedig, Mesa, AZ (US); Jeffrey D Harrison, Mesa, AZ (US); Mark C Morris, Phoenix, AZ (US); Raymond Gage, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 188 days.

(21) Appl. No.: 16/260,537

(22) Filed: Jan. 29, 2019

(65) Prior Publication Data

US 2020/0240279 A1    Jul. 30, 2020

(51) Int. Cl.
*F01D 9/04*    (2006.01)
*F01D 25/12*    (2006.01)
(Continued)

(52) U.S. Cl.
CPC ............. *F01D 9/047* (2013.01); *F01D 25/12* (2013.01); *F02C 7/18* (2013.01); *F02K 3/06* (2013.01);
(Continued)

(58) Field of Classification Search
CPC . F01D 5/08; F01D 5/081; F01D 5/082; F01D 5/084; F01D 5/085; F01D 5/087;
(Continued)

(56) References Cited

U.S. PATENT DOCUMENTS 5,997,244 A * 12/1999 Gebre-Giorgis ........ F01D 5/081
415/115
6,773,225 B2 * 8/2004 Yuri .......................... F01D 5/08
415/1

(Continued)

OTHER PUBLICATIONS

Mohammad Shojib Hossain; Process Development and Characterization of Smart Partsfabricated Using Powder Bed Fusion Additive Manufacturing Technologies; Doctoral Program in Mechanical Engineering; Department of Mechanical Engineering, The University of Texas at El Paso, Dec. 2017.

(Continued)

*Primary Examiner* — Ehud Gartenberg
*Assistant Examiner* — Henry Ng
(74) *Attorney, Agent, or Firm* — Lorenz & Kopf, LLP

(57) ABSTRACT

Disclosed is a tangential on-board injector (TOBI) system that includes an annulus and a plurality of cooling airflow passages disposed about the annulus. Each cooling airflow passage of the plurality of cooling airflow passages includes an inlet opening having a polygonal inlet cross-section, the inlet opening having an inlet cross-sectional area. Each cooling airflow passage of the plurality of cooling airflow passages further includes an outlet opening having an outlet cross-section and an outlet cross-sectional area. The inlet cross-sectional area is greater in magnitude than the outlet cross-sectional area. Also disclosed are additive manufacturing methods for manufacturing the tangential on-board injector system and gas turbine engines that incorporate the tangential on-board injector system.

13 Claims, 10 Drawing Sheets

(51) Int. Cl.
  *F02C 7/18* (2006.01)
  *F02K 3/06* (2006.01)
  *B33Y 10/00* (2015.01)
  *B33Y 80/00* (2015.01)
(52) U.S. Cl.
  CPC .............. *B33Y 10/00* (2014.12); *B33Y 80/00* (2014.12); *F05D 2230/22* (2013.01); *F05D 2240/127* (2013.01); *F05D 2250/11* (2013.01); *F05D 2250/131* (2013.01); *F05D 2250/51* (2013.01); *F05D 2250/52* (2013.01); *F05D 2260/14* (2013.01)
(58) Field of Classification Search
  CPC ... F01D 5/088; F01D 9/00; F01D 9/02; F01D 9/023; F01D 9/026; F01D 9/04; F01D 9/041; F01D 9/042; F01D 9/044; F01D 9/045; F01D 9/047; F01D 9/048; F01D 9/06; F01D 9/065; F01D 25/12; F02C 7/18; F02K 3/06; B33Y 10/00; B33Y 80/00; F05D 2230/22; F05D 2240/127; F05D 2250/11; F05D 2250/131; F05D 2250/51; F05D 2250/52; F05D 2260/14
  See application file for complete search history.

(56) References Cited

U.S. PATENT DOCUMENTS

| | | | |
|---|---|---|---|
| 8,562,285 B2 * | 10/2013 | McCaffrey | F02C 7/28 |
| | | | 415/115 |
| 9,039,917 B2 | 5/2015 | Szuromi et al. | |
| 9,062,562 B2 | 6/2015 | Coupe et al. | |
| 9,289,826 B2 | 3/2016 | Morris et al. | |
| 9,932,903 B2 | 4/2018 | Pidcock et al. | |
| 9,945,248 B2 | 4/2018 | McCaffrey | |
| 10,584,594 B2 * | 3/2020 | Neeli | F01D 5/187 |
| 10,683,809 B2 * | 6/2020 | Waslo | F01D 25/12 |
| 2008/0041064 A1 * | 2/2008 | Moore | F01D 5/081 |
| | | | 60/782 |
| 2009/0067986 A1 * | 3/2009 | Mignano | F04D 29/321 |
| | | | 415/115 |
| 2011/0052372 A1 * | 3/2011 | Lecuyer | F01D 5/025 |
| | | | 415/115 |
| 2013/0219917 A1 * | 8/2013 | Suciu | F01D 25/125 |
| | | | 60/782 |
| 2015/0323186 A1 | 11/2015 | Xu | |
| 2015/0369130 A1 * | 12/2015 | Suciu | F02C 7/18 |
| | | | 415/1 |
| 2016/0032766 A1 | 2/2016 | Bunker et al. | |
| 2016/0153291 A1 | 6/2016 | Snyder et al. | |
| 2016/0214283 A1 | 7/2016 | Schick et al. | |
| 2016/0222982 A1 | 8/2016 | Powell et al. | |
| 2017/0009590 A1 * | 1/2017 | Nilsson | F01D 5/187 |
| 2017/0082026 A1 | 3/2017 | Zelesky | |
| 2017/0082027 A1 | 3/2017 | Zelesky et al. | |
| 2017/0089213 A1 | 3/2017 | Stevens et al. | |
| 2017/0292393 A1 | 10/2017 | Anastas et al. | |
| 2018/0238183 A1 | 8/2018 | Reynolds et al. | |
| 2020/0141241 A1 * | 5/2020 | Sidorovich Paradiso | |
| | | | F01D 9/041 |

OTHER PUBLICATIONS

Misra, Dr. Ajay, et al.; Additive Manufacturing of Aerospace PropulsionComponents; Presented at Additive Manufacturing Conference, Pittsburgh, PA, Oct. 1, 2015.

AMFG / Autonomous Manufacturing, "3d Printing Support Structures: A Complete Guide," available at https://amfg.ai/2018/10/17/3d-printing-support-structures-guide/ (published Oct. 17, 2018).

* cited by examiner

GAS TURBINE ENGINES INCLUDING TANGENTIAL ON-BOARD INJECTORS AND METHODS FOR MANUFACTURING THE SAME

STATEMENT REGARDING FEDERALLY SPONSORED RESEARCH OR DEVELOPMENT

This invention was made with Government support under FA8650-15-D-2504 awarded by the Air Force Research Laboratory (AFRL). The Government has certain rights in the invention.

TECHNICAL FIELD

The present disclosure generally relates to the technical field of gas turbine engines. More particularly, the present disclosure relates to axial-flow gas turbine engines that include tangential on-board injectors, also known as pre-swirlers, between a compressor section and a turbine section for improved operational performance of the turbine engine, and further to methods of manufacturing the same, particularly using additive manufacturing techniques.

BACKGROUND

Gas turbine engines are employed in a variety of applications, such as thrust production for vehicles, electric energy production, and many others. Turbine engines may include a compressor section, wherein inlet air is compressed, followed by a combustor section wherein fuel is combusted with the compressed air to generate exhaust gas. The exhaust gas is then directed to a turbine section, wherein energy is extracted from the exhaust gas.

The turbine section may include a rotor assembly. The rotor assembly may include a plurality of turbine blades installed on a rotatable disk. During operation, the turbine blades, the rotating disk, and other components of the turbine section may be exposed to elevated gas-path temperatures, and thus may require cooling. Cooling may be provided to turbine section components using cooling air extracted from other parts of the engine. When the cooling air is directed at the rotating turbine section, however, losses of turbine rotor energy may occur, resulting in a drop in pressure and a temperature increase. To minimize these effects, the static-to-rotating transition may be accomplished using stationary tangential on-board injectors (TOBIs) (also referred to herein equivalently as "TOBI systems"). TOBIs are used to bleed air from the compressor section to the turbine section to cool the turbine rotor, which improves turbine inlet temperature capability, thus improving operational efficiency. In addition, TOBIs re-direct airflow tangentially to match the direction of rotation of the turbine components to minimize mechanical losses from the incoming cooling air.

In particular, TOBI systems may include a series of circumferentially spaced nozzle orifices that accelerate and direct the cooling air via a plurality of openings such that the tangential speed of the cooling air matches or exceeds that of the rotating turbine components at the radius where the cooling air flow is being introduced. A plurality of cooling holes serves as an inlet for cooling air in fluid communication with the turbine blade hot gas flow path. A portion of the cooling air leaving the TOBI openings traverses the distance between the TOBI exit (i.e., downstream end) and enters the plurality of cooling holes, which ultimately provides cooling air to the turbine blades.

The aforementioned cooling airflow passages through the TOBI have conventionally been drilled holes, cast shapes, or cast and reamed holes. One consideration in the design of a TOBI system is to ensure that the discharge coefficient ($C_d$) through the airflow passages is sufficient to cool the turbine disk and blades. The $C_d$ describes the ratio of the actual discharge through the airflow passages (i.e., mass flow rate) to the theoretical discharge. Due to design constraints when using conventional manufacturing techniques, TOBI systems have been prone to experience cooling airflow separation within the cooling airflow passages. Airflow separation (i.e., an airflow at the walls of the passages characterized by eddies and vortices, as compared to a smooth boundary layer) has been shown to significantly reduce the $C_d$ value, thus, reducing engine efficiency. Moreover, cooling airflow separation may result in insufficient cooling the rotating turbine disk and blades.

Accordingly, the prior art remains deficient. It would therefore be desirable to provide TOBI systems that have improved cooling airflow passage designs that reduce the potential for airflow separation, and thus increase the $C_d$. Moreover, given the manufacturing constraints of TOBI systems using conventional manufacturing techniques, it would also be desirable to describe advanced manufacturing methods that allow for the efficient and cost-effective production of such non-conventional TOBI cooling airflow passage designs. Furthermore, other desirable features and characteristics of the TOBI systems and related manufacturing methods will become apparent from the subsequent detailed description and the appended claims, taken in conjunction with the accompanying drawings and the preceding background.

BRIEF SUMMARY

This Brief Summary is provided to describe select concepts in a simplified form that are further described in the Detailed Description. Moreover, this Brief Summary is not intended to identify any key or essential features of the claimed subject matter, nor is it intended to be used as an aid in determining the scope of the claimed subject matter.

In one embodiment, the present disclosure provides a tangential on-board injector system includes an annulus and a plurality of cooling airflow passages disposed about the annulus. Each cooling airflow passage of the plurality of cooling airflow passages comprises includes an inlet opening having a polygonal inlet cross-section of at least three sides and at least three interior angles, the inlet opening having an inlet cross-sectional area, and an outlet opening having an outlet cross-section and an outlet cross-sectional area. The inlet cross-sectional area is greater in magnitude than the outlet cross-sectional area.

In another embodiment, the present disclosure provides a tangential on-board injector system that includes an annulus and a plurality of cooling airflow passages disposed about the annulus. Each cooling airflow passage of the plurality of cooling airflow passages includes an inlet opening having a polygonal inlet cross-section of at least five sides and at least five interior angles, the inlet opening having an inlet cross-sectional area. Each cooling airflow passage of the plurality of cooling airflow passages further includes an outlet opening having an outlet cross-section and an outlet cross-sectional area. The inlet cross-sectional area is greater in magnitude than the outlet cross-sectional area.

In yet another embodiment, the present disclosure provides a method for manufacturing a tangential on-board injector system including the step of creating or supplying a 3-dimensional design of the tangential on-board injector system. The 3-dimensional design is characterized as including an annulus and a plurality of cooling airflow passages disposed about the annulus. Each cooling airflow passage of the plurality of cooling airflow passages includes an inlet opening having a polygonal inlet cross-section of at least three sides and at least three interior angles, the inlet opening having an inlet cross-sectional area. Each cooling airflow passage of the plurality of cooling airflow passages further includes an outlet opening having an outlet cross-section and an outlet cross-sectional area. The inlet cross-sectional area is greater in magnitude than the outlet cross-sectional area. The method further includes the step of, using an additive manufacturing process, manufacturing the tangential on-board injector system in accordance with the 3-dimensional design.

BRIEF DESCRIPTION OF THE DRAWINGS

The present disclosure will hereinafter be described in conjunction with the following Drawing Figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding Technical Field, Background, Brief Summary, or the following Detailed Description.

The present disclosure generally describes TOBI systems utilizing cooling airflow passages that have improved airflow characteristics, such as reduced flow separation and increased $C_d$. The airflow passages, in some embodiments, generally have a triangular-shaped inlet opening that gradually transitions to a circular metering section downstream. The airflow passages, in other embodiments, generally have a pentagonal or "cathedral" shaped inlet opening that gradually transitions to a circular metering section downstream. Other polygonal-shaped inlet openings are also possible. The airflow passages may converge to a smaller cross-sectional area downstream to prevent flow separation, and the airflow passage may gradually transition from the radial direction to the tangential direction to improve turbine cooling. The entire airflow passage (and thus the entire TOBI itself) may be initially formed using additive manufacturing techniques so as to have the polygonal cross-section, but the metering section may be subsequently machined to a desired circular cross-section, the size of which may be selected based on the cooling requirements of a particular turbine implementation. As such, a single additively manufactured TOBI system can be adapted in this manner for various turbine-cooling requirements. Greater detail regarding the inventive TOBI systems of the present disclosure is provided below with regard to FIGS. 1-9.

Figure 1:
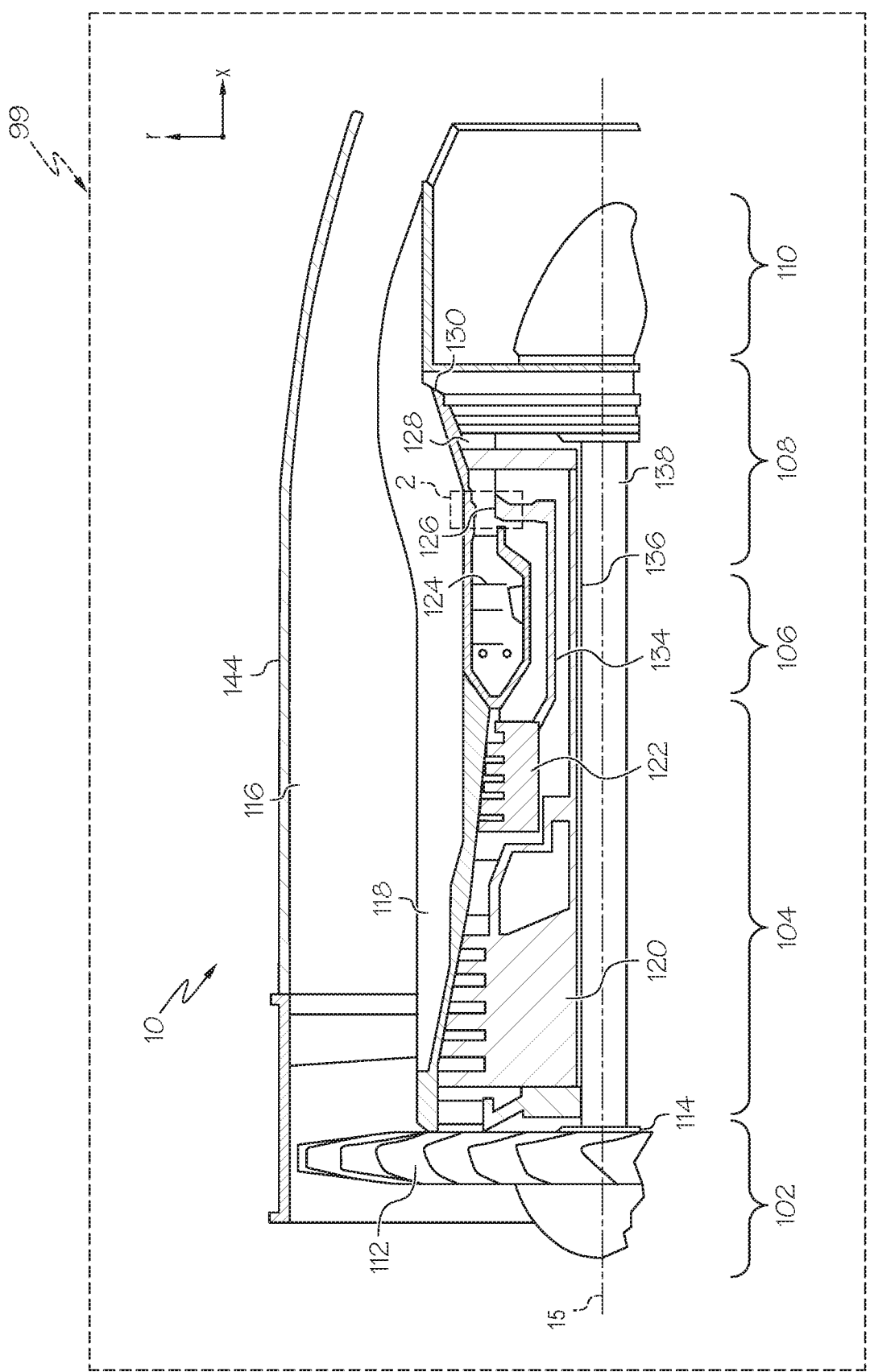
FIG. 1 depicts a simplified schematic diagram of an axial-flow gas turbine engine in accordance with the present disclosure.

With reference to FIG. 1, a partial, cross-sectional view of an exemplary gas turbine engine 10 is shown with the remaining portion of the gas turbine engine 10 being axisymmetric about a longitudinal axis 15, which also comprises an axis of rotation for the gas turbine engine 10. In the depicted embodiment, the gas turbine engine 10 is an annular multi-spool turbofan gas turbine jet engine 10 within an aircraft 99, although other arrangements and uses may be provided. The gas turbine engine 10 may be, for example, an auxiliary power unit ("APU"). With regard to the FIG. 1 and the following Figures, the "x" direction represents the axial direction (left-to-right being the axial downstream flow path of the air/gasses through the engine), and the "r" direction represents the radial direction (radially outward from central axis 15).

In this example, the gas turbine engine 10 includes fan section 102, a compressor section 104, a combustor section 106, a turbine section 108, and an exhaust section 110. The fan section 102 includes a fan 112 mounted on a rotor 114 that draws air into the gas turbine engine 10 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 118 and an outer casing 144. In the embodiment of FIG. 1, the compressor section 104 includes an intermediate-pressure compressor 120 and a high-pressure compressor 122. However, in other embodiments, the number of compressors in the compressor section 104 may vary. In the depicted embodiment, the intermediate pressure compressor 120 and the high-pressure compressor 122 sequentially raise the pressure of the air and direct a majority of the high-pressure air into the combustor section 106. A fraction of the compressed air bypasses the combustor section 106 and is used to cool, among other components, turbine components in the turbine section 108 via an inner bypass duct using the TOBI systems of the present disclosure, as will be described in greater detail below.

In the embodiment of FIG. 1, in the combustor section 106, which includes a combustion chamber 124, the high-pressure air is mixed with fuel and combusted. The high-temperature combusted air is then directed into the turbine section 108. In this example, the turbine section 108 includes three turbines disposed in axial flow series, namely, a high-pressure turbine 126, an intermediate-pressure turbine 128, and a low-pressure turbine 130. However, it will be appreciated that the number of turbines, and/or the configurations thereof, may vary. In this embodiment, the high-temperature combusted air from the combustor section 106 expands through and rotates each turbine 126, 128, and 130. As the turbines 126, 128, and 130 rotate, each drives equipment in the gas turbine engine 10 via concentrically disposed shafts or spools. In one example, the high-pressure turbine 126 drives the high-pressure compressor 122 via a high pressure shaft 134, the intermediate-pressure turbine 128 drives the intermediate-pressure compressor 120 via an intermediate-pressure shaft 136, and the low-pressure turbine 130 drives the fan 112 via a low-pressure shaft 138.

Figure 2:
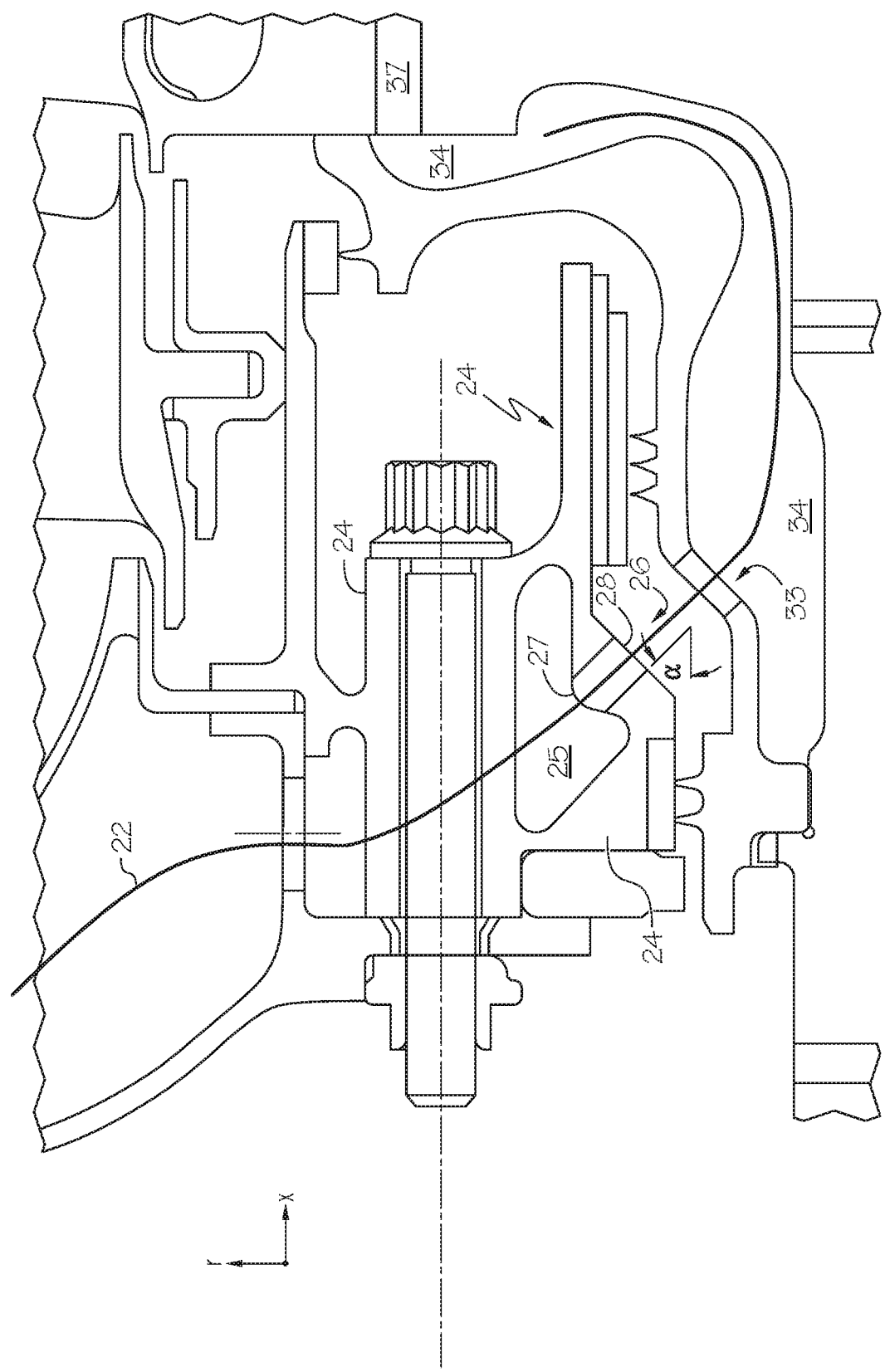
FIG. 2 is an enlarged view of the gas turbine engine 10 of FIG. 1, which shows an area between the compressor section and the turbine section at a relatively low radius, in accordance with the present disclosure.

FIG. 2 is an enlarged view of the gas turbine engine 10 of FIG. 1, which shows an area near turbine section 108 (see dashed box "2" in FIG. 1 for the approximate axial and radial bounds, respectively, of the gas turbine engine 10 illustrated in FIG. 2). As illustrated in FIG. 2, cooling air 22 may be bled from the compressor section 104 (out of view to the left in FIG. 2) and passed through a TOBI inlet cavity 25 of TOBI system 24 in accordance with the present disclosure. TOBI system 24 includes a plurality of cooling airflow passages 26, which are defined between a passage inlet opening 27 and a passage outlet opening 28. Cooling airflow passages 26 may be angled both radially-inward and axially-downstream, as shown in FIG. 2. The angle of radial incline (a) of cooling airflow passages 26 may be from about 20 to about 70 degrees, such as about 30 to about 60 degrees, for example from about 40 to about 50 degrees, or, in one particular embodiment, about 45 degrees. The angle of radial incline (a) of cooling airflow passages 26 may alternatively be from about 20 to about 30 degrees, from about 30 to about 40 degrees, from about 50 to about 60 degrees, or from about 60 to about 70 degrees. In other embodiments, the TOBI may be substantially radial with the radial angle α being from about 70 to about 90 degrees. Additionally, in other embodiments, the TOBI may be substantially axial with the radial angle α being from about 0 to about 20 degrees. It should also be noted that cooling airflow passages 26 may furthermore become increasingly tangential in orientation (i.e., into the page of FIG. 2) from the inlet opening 27 to the outlet opening 28, a feature that will be shown and described in greater detail below in connection with FIGS. 4-6.

As further illustrated in FIG. 2, upon passing through the outlet opening 28 of TOBI 24, the cooling air 22 is directed to a cavity opening 33 of the turbine disk cavity 34. In this regard, cooling air 22 may be provided to purge the turbine disk cavity 34, in order to allow for higher operating temperatures of the turbine section 108 (and thus greater operating efficiencies of the gas turbine engine 10). Due to the aforementioned change to a tangential orientation at the outlet opening 28, the cooling air 22 that is directed to cavity opening 33 of the turbine disk cavity 34 has a tangential flow component, which minimizes pressure drop and improves cooling efficiency. The cooling air 22 then leaves the turbine disk cavity 34 through a turbine blade slot 37.

Figure 3:
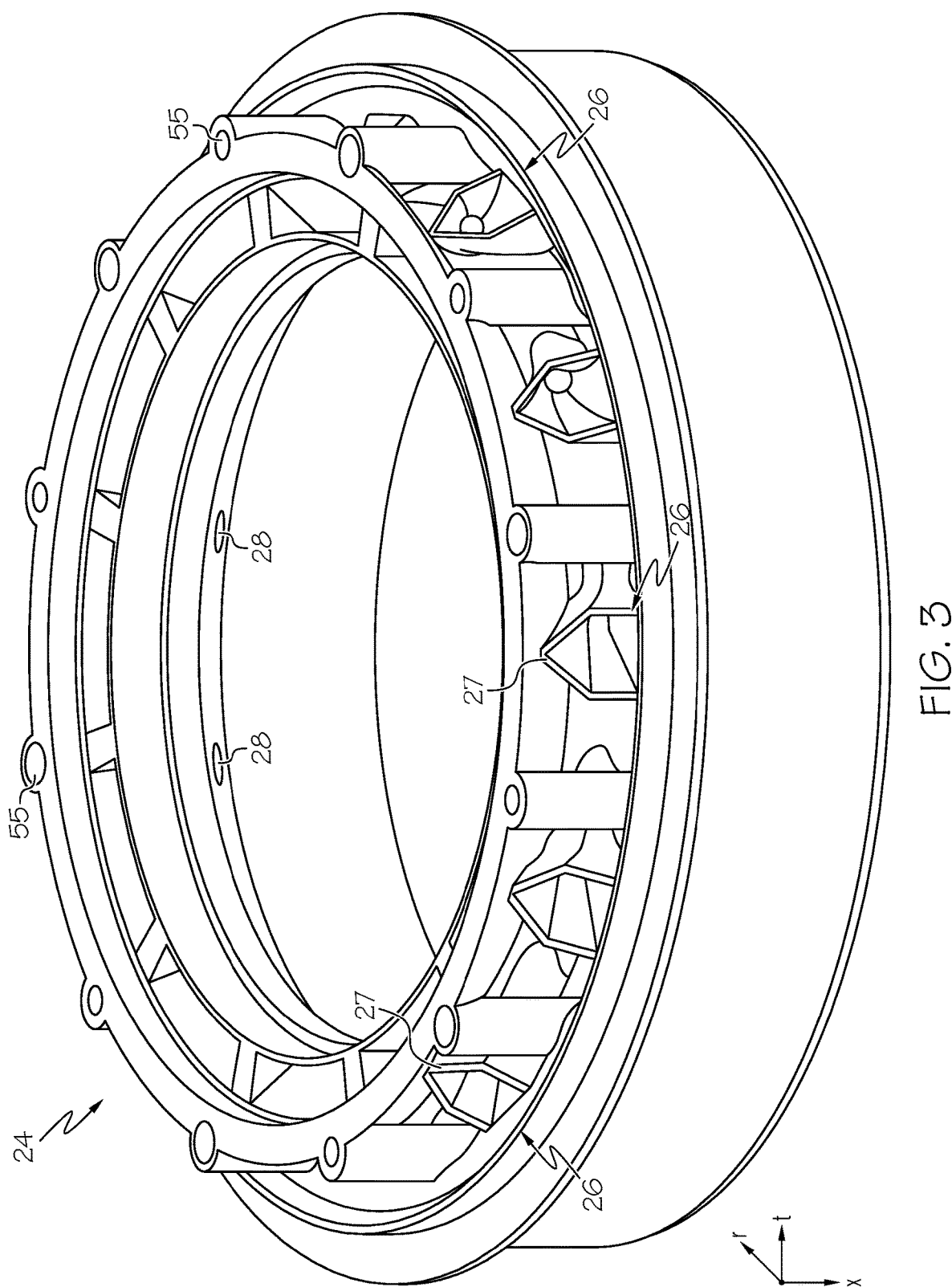
FIG. 3 provides a perspective view of a TOBI system, isolated from the rest of the gas turbine engine, in accordance with the present disclosure.

FIG. 3 provides a perspective view of the TOBI 24, isolated from the rest of the gas turbine engine 10. As illustrated, the TOBI 24 is generally annular in configuration, and the cooling airflow passages 26 are disposed within the annulus at regular intervals (though an irregular spacing could be possible in some embodiments). A plurality of bolt-holes 55 may also be annularly spaced within TOBI 24, in order to allow for the TOBI to be securely installed between mechanical components of the compressor section 104 and mechanical components the turbine section 108. In the foreground of FIG. 3, the inlet openings 27 of the cooling airflow passages 26 are visible, while in the background, within the annulus, portions of the outlet openings 28 are visible. As illustrated, the cross-sectional configuration (with regard to the direction of cooling airflow 22) of the inlet openings is, in the embodiment of FIG. 3, generally pentagonal (a feature that could not be appreciated in view of FIG. 2). (A triangular embodiment is shown below in FIG. 5.) Furthermore, as illustrated, the cross-sectional area of the cooling airflow passages 26 (again with regard to the direction of cooling airflow 22) becomes gradually smaller as the cooling airflow passages 26 extend from their inlet openings 27 to their outlet openings 28 (also a feature that could not be appreciated in the view of FIG. 2, due to the concurrent change in orientation to being increasingly tangential (note that the reference axis in FIG. 3 includes a third direction "t" for tangential)). The cross-sectional configuration and size of the cooling airflow passageways is described in greater detail below with regard to FIGS. 4-8.

Figure 4:
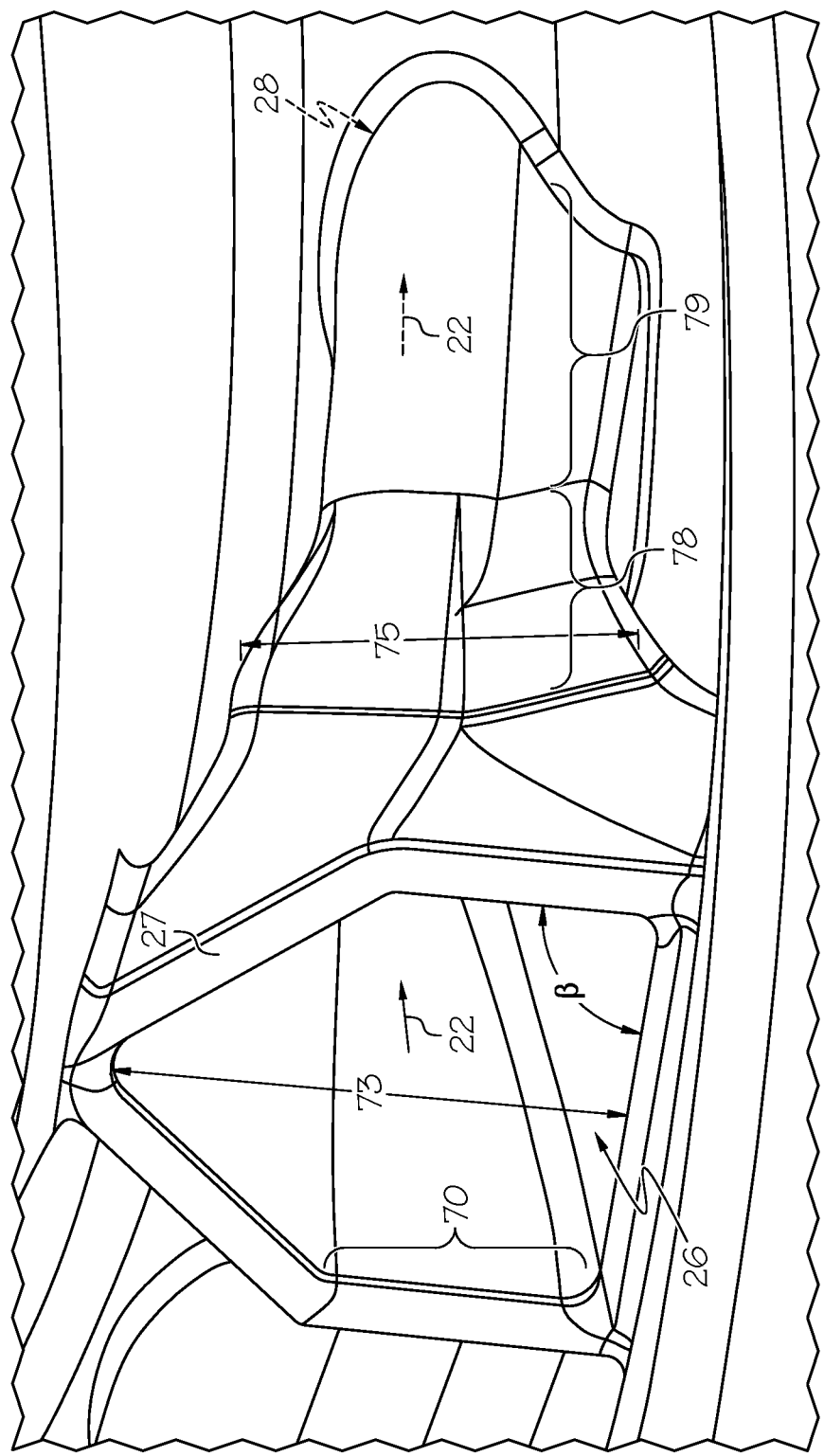
FIG. 4 provides an enlarged view of a single cooling airflow passage of a TOBI system having a five-sided opening in accordance with one embodiment of the present disclosure.
Figure 5:
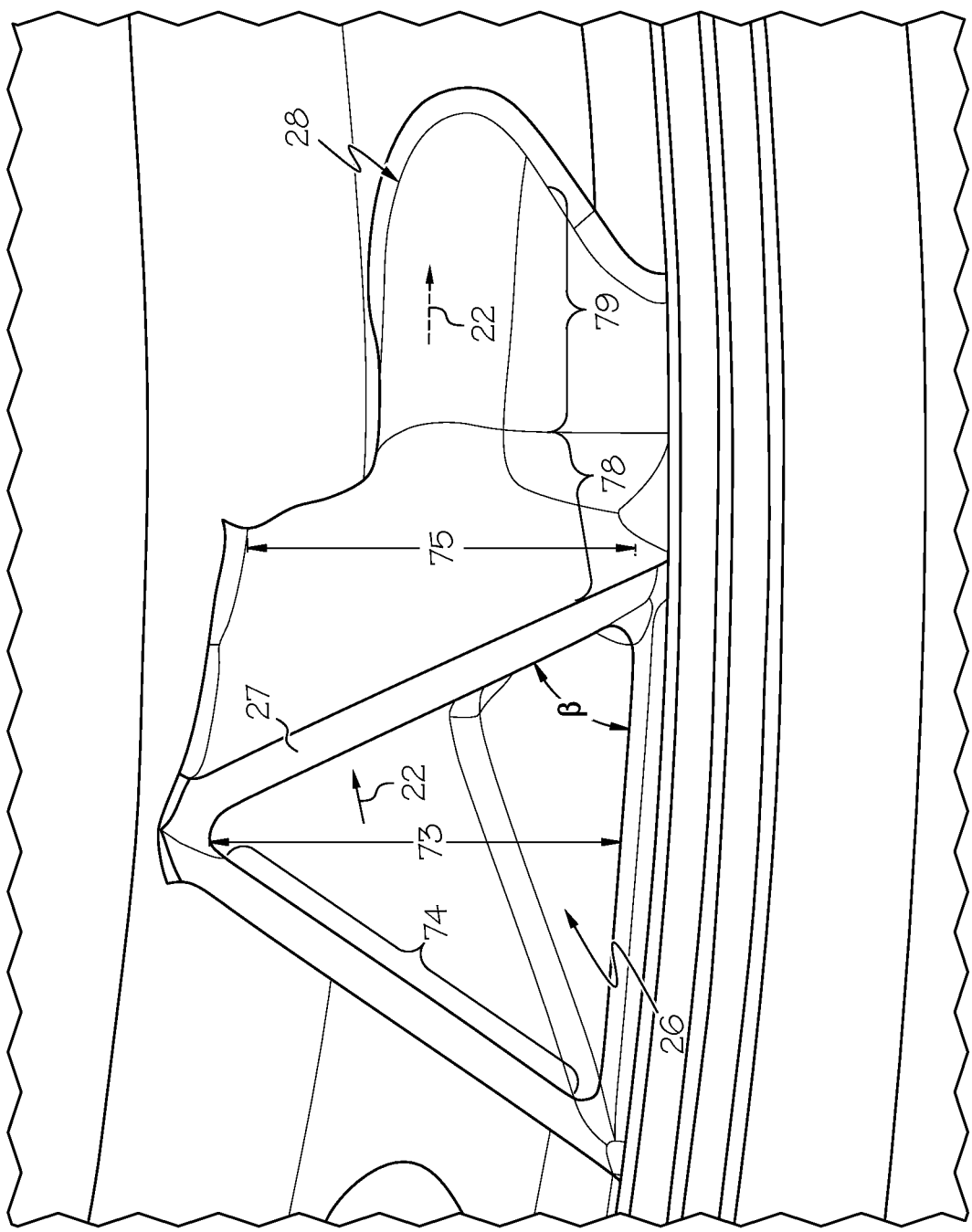
FIG. 5 provides an enlarged view of a single cooling airflow passage of a TOBI system having a three-sided opening in accordance with another embodiment of the present disclosure FIG. 6 provides an enlarged view of a single cooling airflow passages of a TOBI system in accordance with the embodiment of FIG. 4, but with a more tangentially-oriented view, in accordance with the present disclosure.
Figure 5:
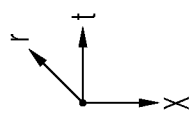

FIG. 4 provides an enlarged view of a single one of the plurality of cooling airflow passages 26 of the TOBI 24. Three features of the cooling airflow passages 26, in particular, are well-illustrated in FIG. 4, including: (1) the pentagonal cross-section, (2) the cross-section that decreases in size from inlet opening 27 to outlet opening 28, and (3) the change in flow direction to include a tangential component. All three will be discussed in turn, below. First, regarding the pentagonal cross-section, as used herein, the term pentagonal is used to refer to any shape that has five sides. There is no requirement that any single side (e.g., side 70) be the same length as any of the other four sides, although it may be. Moreover, there is no requirement that any single interior angle (13) be the same as any of the other four interior angles, although it may be. The interior angles need not be sharp (as in a vertex, although they may be), but rather may smoothly transition (curve) from one side to the next. Still further, there is no requirement that any single side be perfectly linear, although it may be; rather, any given side (e.g., side 70) may be curved, bent, irregular, or otherwise non-linear. Additionally, the relative proportions/angles of the pentagon need not remain consistent as the cooling airflow passage 26 proceeds from its inlet opening 27 towards its outlet opening 28, although they may be; rather, any angle, proportion amongst side lengths, or linearity of sides may change as the cooling airflow passageway proceeds downstream. Furthermore, it should be appreciated that in alternative embodiments, polygons having other than five sides (such as three, four, six, seven, eight, or more) may be employed accordingly to the foregoing convention (a triangular-shaped inlet cross-section is shown in FIG. 5, described below). In a particular embodiment, the pentagonal cross-section may be referred to as a "cathedral" cross-section, wherein two base angles (associated with a base side that runs tangential to the annulus, interior angle β being one of the two) and a vertex angle (opposite the base side) are each about 90 degrees, and the remaining two angles are each about 135 degrees. This configuration has been shown to eliminate the need for support structures during additive manufacturing, as will be discussed in greater detail below with regard to FIG. 9.

Second, regarding the cross-section of the cooling airflow passage 26 that decreases in size from inlet opening 27 to outlet opening 28, FIG. 4 illustrates reference lengths 73 and 75, wherein reference length 73 is provided at the inlet opening 27 and reference length 75 is provided downstream in the cooling airflow passage 26 from inlet opening 27 (but prior to outlet opening 28). Each reference length 73, 75 is taken at the pentagonal cross-section from a "base" side to its opposite interior angle ("apex"), as illustrated. As can be seen, reference length 73 is greater in magnitude than reference length 75, thus illustrating that the pentagonal cross-section of the cooling airflow passage 26 decreases in size (area) from the inlet opening 27 downstream towards the outlet opening 28. This configuration of the cooling airflow passage 26 provides a continuously converging flow area that suppresses flow separation. Once the cooling air 22 enters the passage 26, the passage begins to converge continuously down in size (area), which reduces the chances of flow separation, minimizing pressure drop and maximizing the $C_d$.

Third, regarding the change in cooling airflow direction to include a tangential component, it should be appreciated that the cooling air (solid arrow 22 in FIG. 4) enters the cooling airflow passage 26 at inlet opening 27 with a radial flow component and an axial flow component, but substantially no tangential flow component. As used herein, the term "substantially no tangential component" means having a tangential flow component of about 20 degrees or less (90 degrees being fully tangential), such as about 10 degrees or less, for example about 5 degrees or less, and in one embodiment, about 0 degrees. This cooling airflow direction is due to the normal angle to the cross-section of the airflow passage 26 at or near inlet opening 27 having substantially no tangential component. Then, as the cooling airflow passage 26 proceeds downstream to the outlet opening 28, the cooling airflow (dashed arrow 22 in FIG. 4) acquires a substantial tangential flow component, due to the change in directional configuration of the airflow passage 26. As used herein, the term "substantial tangential component" means having a tangential flow component of greater than about 60 degrees (again, 90 degrees being fully tangential), such as greater than about 70 degrees, for example greater than about 80 degrees. This cooling airflow direction is due to the normal angle to the cross-section of the airflow passage 26 at or near outlet opening 28 having a substantial tangential component. This configuration of the cooling airflow passage 26 provides for continuously changing the flow from radial to tangential while suppressing flow separation. The inlet opening 27 to the cooling airflow passage 26 opens in the radial direction to allow incoming air the best opportunity to enter the passage 26. Once the air enters, the passage 26 begins to continuously change in flow vectoring tangentially such that the flow is substantially tangential when it reaches the outlet opening 28 without appreciable flow separation, thereby maximizing the $C_d$.

FIG. 5 presents an alternative embodiment to the illustrations of FIGS. 3-4. In particular, the embodiment shown in FIG. 5 has a triangular cross-section of the passage 26. First, regarding the triangular cross-section, as used herein, the term triangular is used to refer to any shape that has three sides. There is no requirement that any single side (e.g., side 74) be the same length as any of the other two sides, although it may be. Moreover, there is no requirement that any single interior angle (β) be the same as any of the other two interior angles, although it may be. The interior angles need not be sharp (as in a vertex, although they may be), but rather may smoothly transition (curve) from one side to the next. Still further, there is no requirement that any single side be perfectly linear, although it may be; rather, any given side (e.g., side 74) may be curved, bent, irregular, or otherwise non-linear. Each reference length 73, 75 is taken at the triangular cross-section from a "base" side to its opposite interior angle ("apex"), as illustrated. As can be seen, reference length 73 is greater in magnitude than reference length 75, thus illustrating that the triangular cross-section of the cooling airflow passage 26 decreases in size (area) from the inlet opening 27 downstream towards the outlet opening 28.

Figure 6:
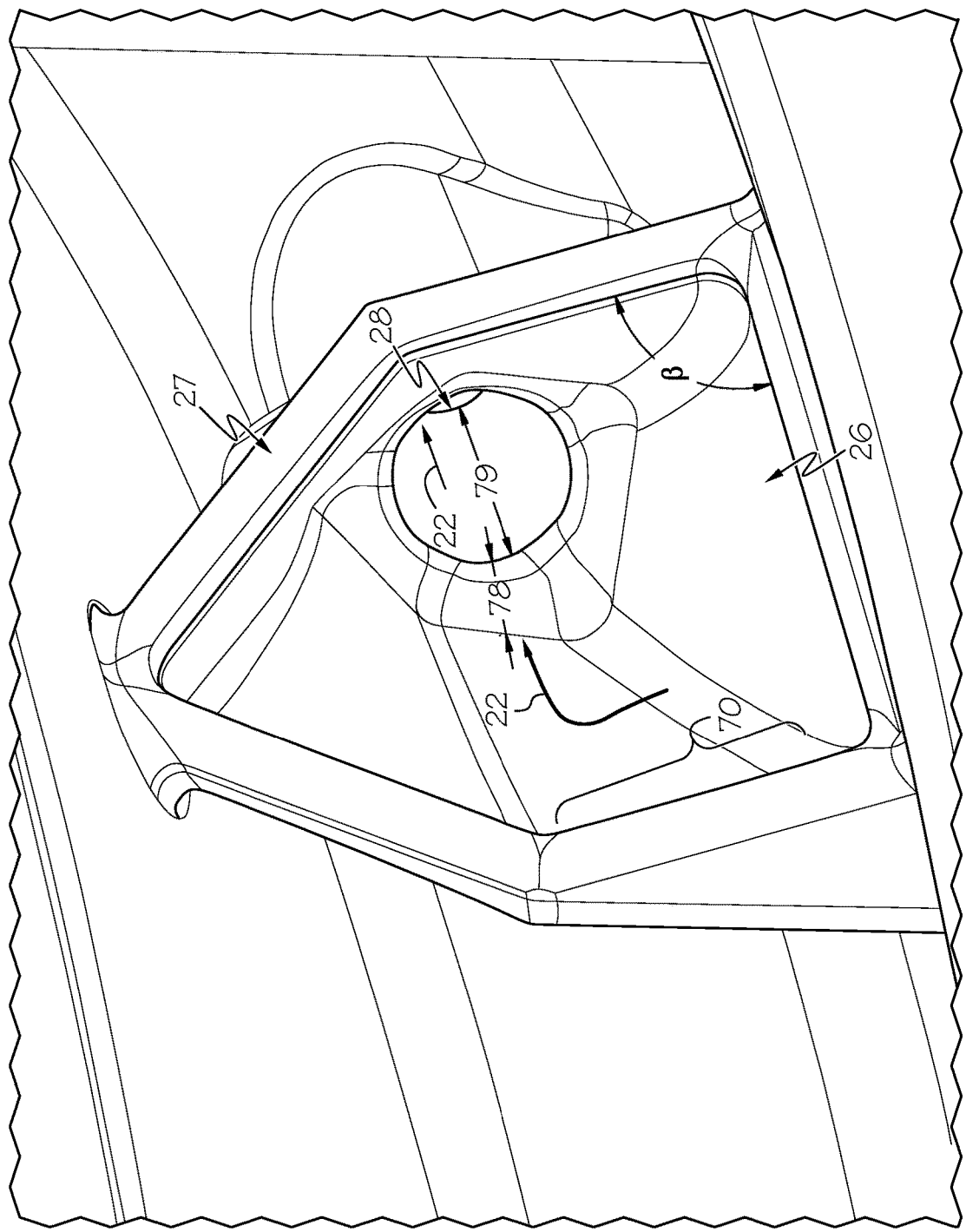

FIG. 6 also provides an enlarged view of a single one of the plurality of cooling airflow passages 26 of the TOBI 24 having a pentagonal cross-section (as in the embodiment of FIGS. 3 and 4), but with a more tangentially-oriented view to better illustrated two additional features of the cooling airflow passages 26 that are not as readily apparent in FIG. 4. (Of course, the view shown in FIG. 6 could be adapted to a polygon of any number of sides, as described herein.) As to the first additional feature, at some length along the airflow passage 26, the airflow passage 26 transitions from a pentagonal cross-section to a circular cross-section, at transition zone 78. The transition zone 78 may be present at a length downstream relative to the overall length of the airflow passage 26. The transition zone 78 may occupy (in total) any amount of the overall length of the airflow passage 26. The transition from the pentagonal (or in the case of the embodiment of FIG. 5, triangular) cross-section to a circular cross-section may occur via a gradual (or alternatively, abrupt) smoothing and widening of the interior angles of the pentagon along with a gradual (or alternatively, abrupt) curving of the sides of the pentagon, for example as illustrated.

As to the second additional feature shown in FIG. 6, downstream beyond the transition zone 78 (i.e., beginning at the downstream end of the transition zone 78), until the outlet opening 28 is reached, the cooling airflow passages 26 include a metering section 79 that has a circular (or substantially circular) cross section. The metering section 79 may occupy (in total) any amount of the overall length of the airflow passage 26. The metering section 79 is provided so as to include the substantially-tangential directional component, which as noted above, provides various efficiencies to the operation of the gas turbine engine 10.

Figure 7A:
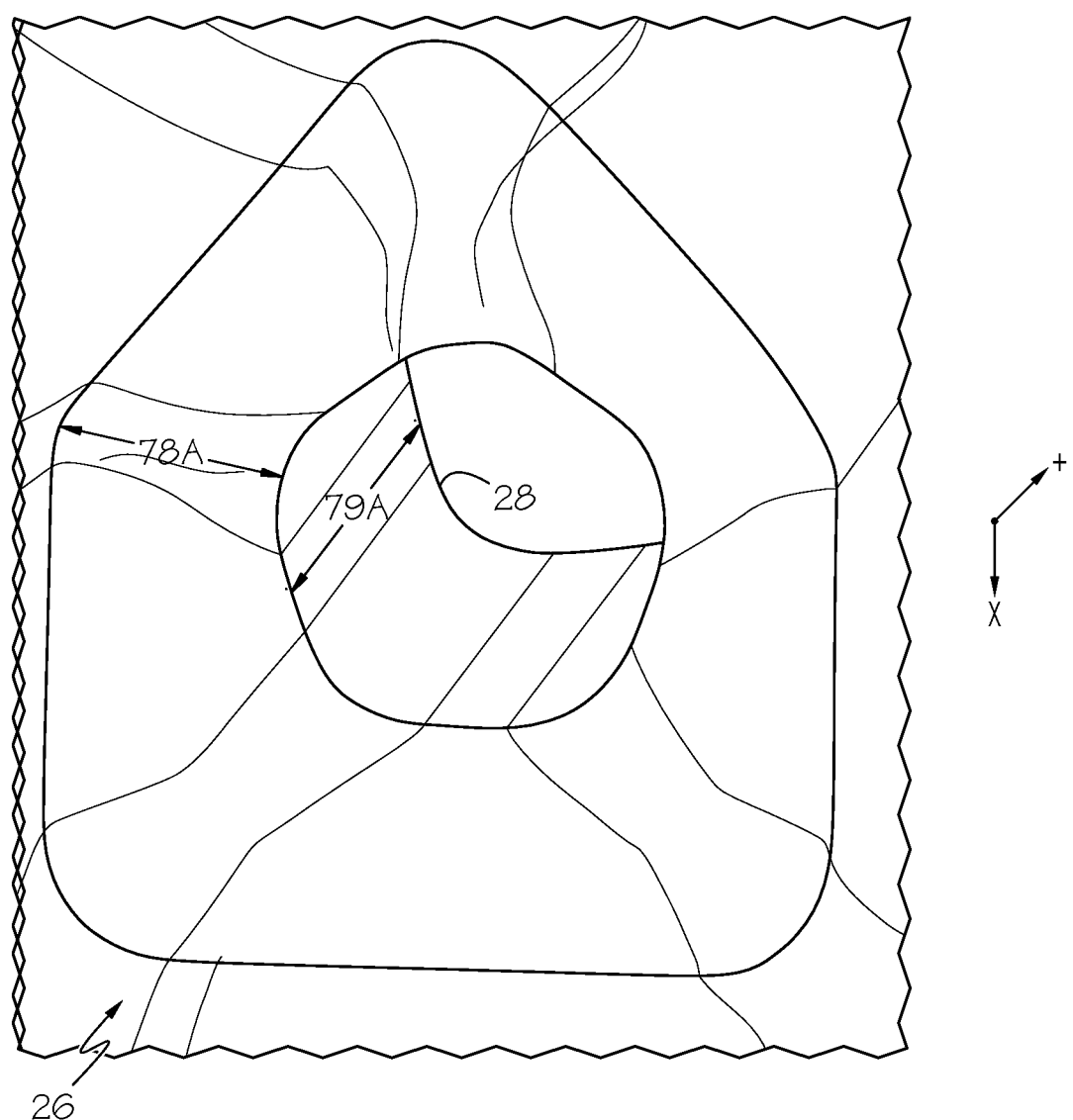
FIGS. 7A and 7B illustrate a difference in configuration of cooling airflow passages of a TOBI system (embodiment of FIG. 4) without additional (post-additive manufacturing) machining (FIG. 7A) and with additional machining (FIG. 7B), in accordance with the present disclosure.
Figure 7B:
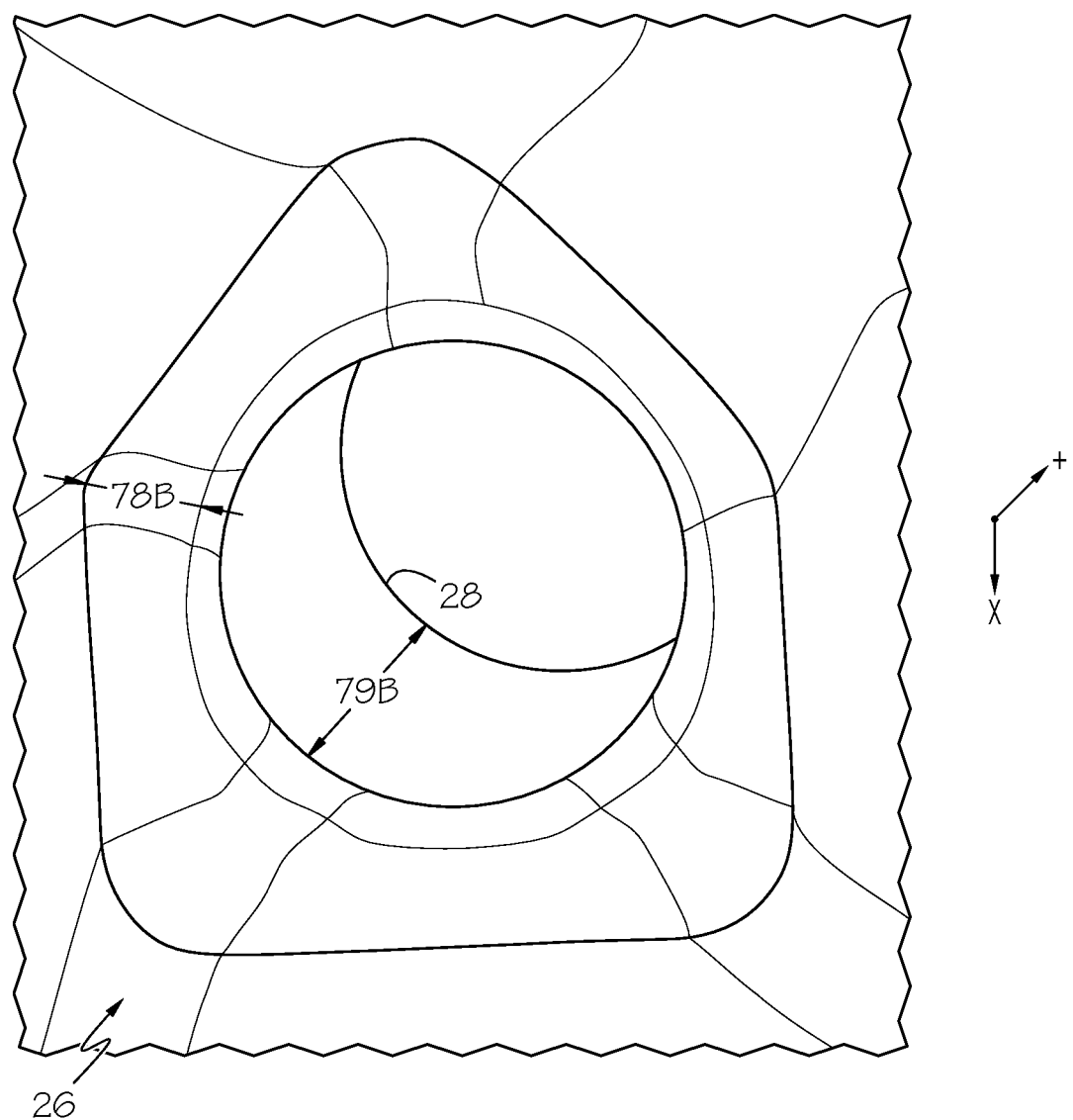

As initially noted above, and as will be described in greater detail below, the TOBI systems of the present disclosure may be initially manufactured using additive manufacturing techniques. FIGS. 7A and 7B illustrate how using these additive manufacturing techniques, in combination with subsequent conventional manufacturing techniques, a single additively manufactured TOBI design can be used in a plurality of different turbine engine implementations (e.g., having different turbine cooling requirements). For example, FIG. 7A is illustrative of the cooling air passage 26 immediately after additive manufacturing, but prior to conventional tooling processes. As can be seen, the metering section 79A is initially manufactured with a pentagonal (or triangular or other polygon in other embodiments) cross-section (and thus the transition zone 78A initially transitions from a larger pentagonal cross-section to the smaller pentagonal cross-section of the metering section 79A). This initial pentagonal cross-section can serve as a pilot hole for subsequent conventional drilling and reaming processes.

Accordingly, as shown in FIG. 7B, subsequent to the initial additive manufacturing, drilling and reaming of the metering section 79B has now occurred, resulting in the circular cross-section of the metering section 79B as illustrated and described above with regard to FIG. 6. Beneficially, the drilling and reaming can be performed to form a (tightly-controlled) circular cross-section of various sizes, anywhere from just larger than the initial pentagonal (or triangular or other polygon in other embodiments) cross-section of the metering section 79B to just smaller than the largest cross-section of the transition zone 78B (i.e., the furthest upstream part thereof). In this manner, a single additively-manufactured TOBI system can be subsequently machined for use in a variety of different engine configurations with different turbine cooling requirements, by varying the size of the cross-sectional area of the metering section 79B for larger or smaller cooling air mass flow rates. In alternative embodiments, the TOBI 24 may be implemented in a turbine engine as-built after additive manufacturing, having the pentagonal metering section 79A configuration of FIG. 7A, without any subsequent drilling and/or reaming.

Figure 8:
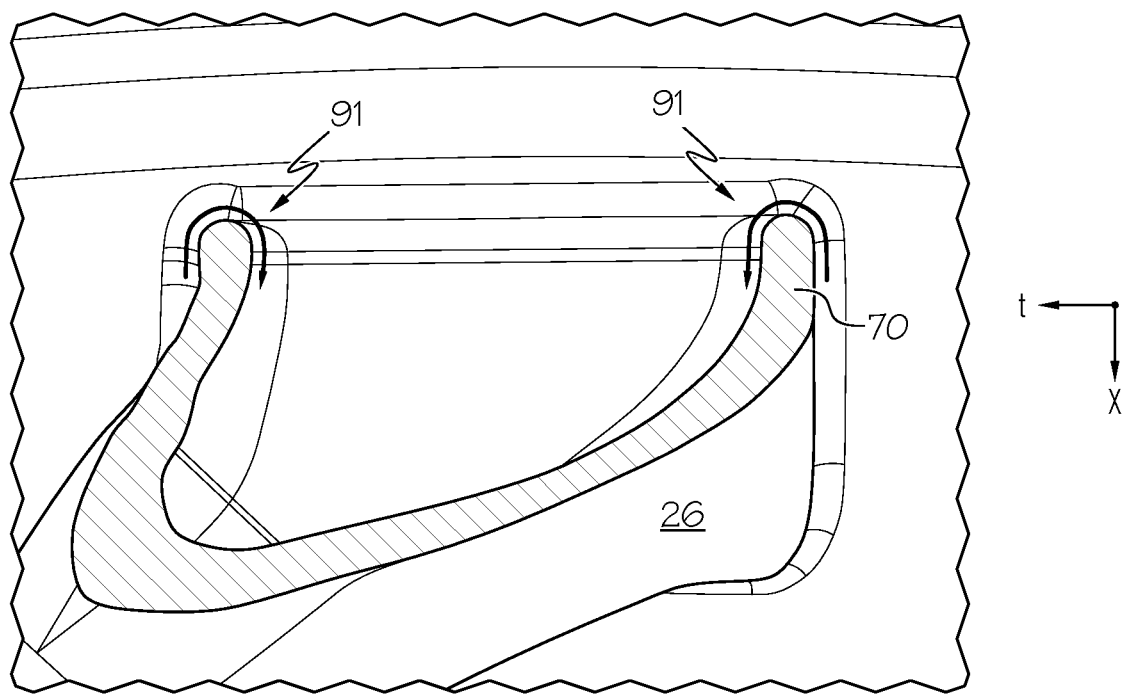
FIGS. 8 and 9 illustrate alternative embodiments for the design of a five-sided inlet opening of a cooling airflow passage of a TOBI system in accordance with the present disclosure.
Figure 9:
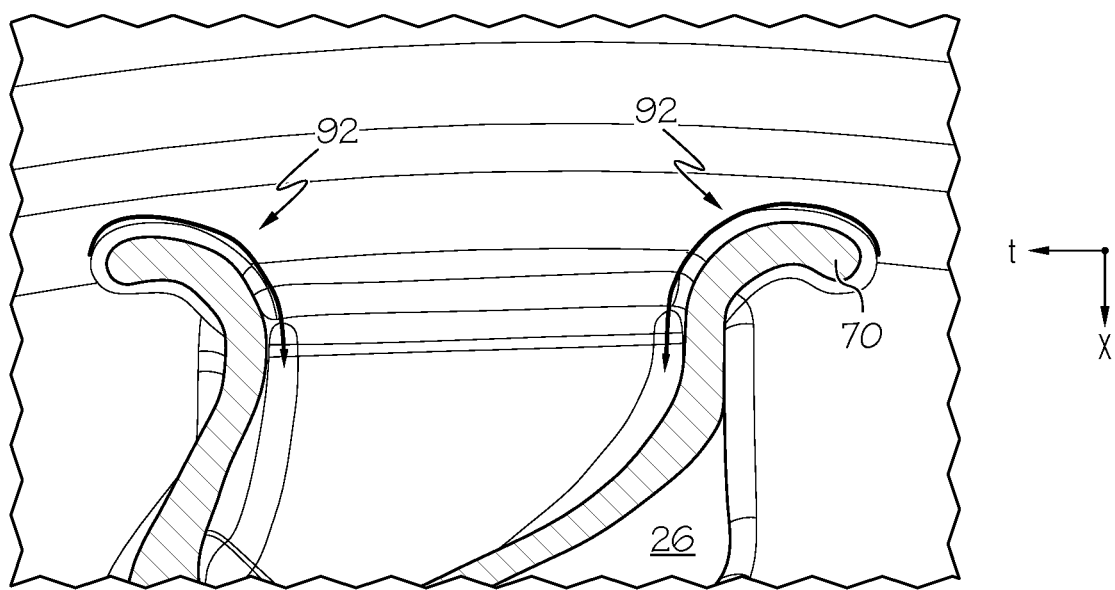

FIGS. 8 and 9 provide greater detail regarding alternative embodiments for the design of the inlet opening 27 of the cooling airflow passage 26. In particular, FIGS. 8 and 9 are cross-sections through an "upper" portion of the inlet opening 27 in alternative embodiments ("upper" herein is used with reference to the orientation of the inlet opening shown on the page in FIG. 5, not with reference to its orientation when implemented in a gas turbine engine). As illustrated in the embodiment of FIG. 8, the side walls (e.g., 70) of the polygonal (triangular, pentagonal, etc.) inlet opening 27 are characterized as having a "full radius edge", meaning that the sidewalls are characterized by opposite parallel surfaces connected together by an edge of about 180 degree curvature, as indicated by curved arrows 91. This configuration is provided to maintain a smooth airflow as the cooling air 22 enters the cooling airflow passage 26, and minimize flow separation (sharp edges may cause the flow to separate when entering). In an alternative embodiment, as shown in FIG. 9, the side walls (e.g., 70) of the polygonal inlet opening 27 are characterized as having a "flowered edge", meaning that the sidewalls curve outwardly (with respect to the cooling airflow passage 26) at the edge to approximately 80-100 degrees (about perpendicular) to the cooling air 22 flow direction upon entering the cooling airflow passage 26, as illustrated by curved arrows 92. This configuration is provided to elongate the entry of the cooling air 22 into the cooling airflow passage 26, thus further minimizing flow separation by allowing more time (and distance) for the cooling air 22 to transition into the cooling airflow passage 26.

It will be appreciated that the presently described TOBI systems 24 would be expensive or impossible to manufacture using conventional manufacturing techniques. As such, designs in accordance with the present disclosure are not known in the prior art. However, the present inventors have discovered that using additive manufacturing techniques, or other recently developed manufacturing techniques, designs in accordance with the present disclosure can be manufactured at a significantly reduced cost as compared to traditional manufacturing techniques. Additive manufacturing techniques include, for example, direct metal laser sintering (DMLS—a form of direct metal laser fusion (DMLF)) with nickel base super-alloys, low-density titanium, and aluminum alloys. DMLS is discussed in greater detail below. Another technique includes electron beam melting (EBM) with titanium, titanium aluminide, and nickel base super-alloy materials. Still further, casting or metal injection molding (MIM) may be employed.

The exemplary TOBI systems 24 may be manufactured using additive manufacturing techniques. Additive manufacturing techniques may begin with providing a model, such as a design model, of the TOBI 24. The model may be defined in any suitable manner. For example, the model may be designed with computer-aided design (CAD) software and may include three-dimensional ("3D") numeric coordinates of the entire configuration of the TOBI 24 including both external and internal surfaces. In one exemplary embodiment, the model may include a number of successive two-dimensional ("2D") cross-sectional slices that together form the 3D component.

The TOBI 24 is formed according to the model, using a rapid prototyping or additive layer manufacturing process. Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication with few or no geometric constraints, fast material processing time, and innovative joining techniques. In one particular exemplary embodiment, direct metal laser fusion (DMLF) may be used to produce the TOBI 24. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted.

Figure 10:
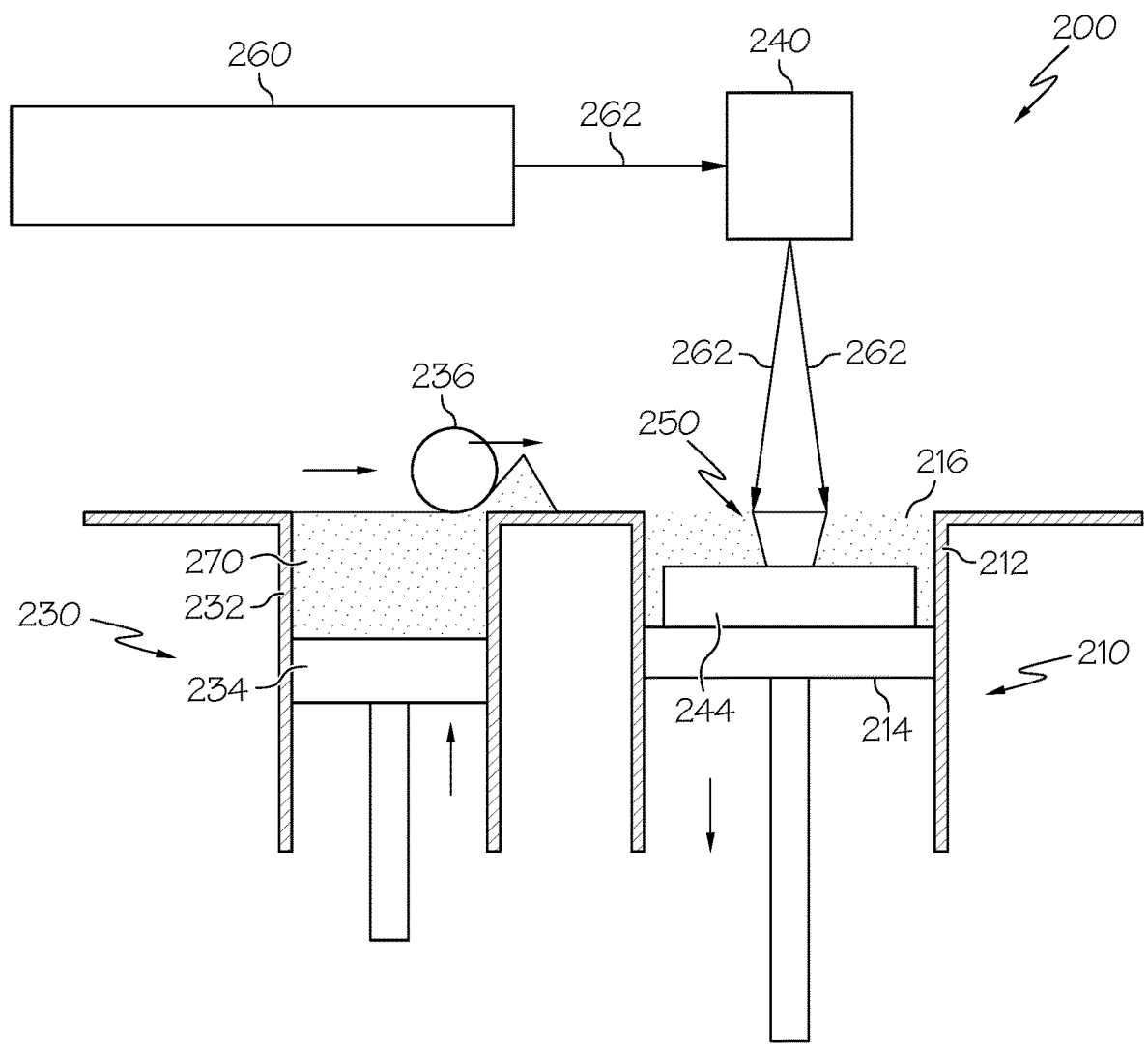
FIG. 10 is a schematic view of an exemplary additive manufacturing system for manufacturing a TOBI system in accordance with the present disclosure.

FIG. 10 is a schematic view of an exemplary DMLF system 200 for manufacturing the TOBI system 24 (for example, as illustrated in FIGS. 3-9) in accordance with an embodiment. The system 200 includes a fabrication device 210, a powder delivery device 230, a scanner 240, and a laser 260 that function to manufacture the article 250 (e.g., the TOBI 24) with build material 270. The fabrication device 210 includes a build container 212 with a fabrication support 214 on which the article 250 is formed and supported. The fabrication support 214 is movable within the build container 212 in a vertical direction and is adjusted in such a way to define a working plane 216. The delivery device 230 includes a powder chamber 232 with a delivery support 234 that supports the build material 270 and is also movable in the vertical direction. The delivery device 230 further includes a roller or wiper 236 that transfers build material 270 from the delivery device 230 to the fabrication device 210.

During operation, a base block 244 may be installed on the fabrication support 214. The fabrication support 214 is lowered and the delivery support 234 is raised. The roller or wiper 236 scrapes or otherwise pushes a portion of the build material 270 from the delivery device 230 to form the working plane 216 in the fabrication device 210. The laser 260 emits a laser beam 262, which is directed by the scanner 240 onto the build material 270 in the working plane 216 to selectively-fuse the build material 270 into a cross-sectional layer of the article 250 according to the design. More specifically, the speed, position, and other operating parameters of the laser beam 262 are controlled to selectively-fuse the powder of the build material 270 into larger structures by rapidly melting the powder particles that may melt or diffuse into the solid structure below, and subsequently, cool and re-solidify. As such, based on the control of the laser beam 262, each layer of build material 270 may include unfused and fused build material 270 that respectively corresponds to the cross-sectional passages and walls that form the article 250. In general, the laser beam 262 is relatively low power to selectively-fuse the individual layer of build material 270. As an example, the laser beam 262 may have a power of approximately 50 to 500 Watts, although any suitable power may be provided.

Upon completion of each layer, the fabrication support 214 is lowered and the delivery support 234 is raised. Typically, the fabrication support 214, and thus the article 250, does not move in a horizontal plane during this step. The roller or wiper 236 again pushes a portion of the build material 270 from the delivery device 230 to form an additional layer of build material 270 on the working plane 216 of the fabrication device 210. The laser beam 262 is movably supported relative to the article 250 and is again controlled to selectively-form another cross-sectional layer. As such, the article 250 is positioned in a bed of build material 270 as the successive layers are formed such that the unfused and fused material supports subsequent layers. This process is continued according to the modeled design as successive cross-sectional layers are formed into the completed TOBI 24.

As a general matter, the build material 270 may be formed by any suitable powder, including powdered metals, such as a stainless steel powder, and alloys and super alloy materials, such as nickel-based or cobalt super-alloys. In one exemplary embodiment, the build material 270 is a high temperature nickel base super alloy such as IN718. In other embodiments, MAR-M-247, IN738, titanium, aluminum, titanium-aluminide, or other suitable alloys may be employed. In general, the powder build material 270 may be selected for enhanced strength, durability, and useful life, particularly at high temperatures, although as described below, the powder build material 270 may also be selected based on the intended function of the area being formed.

When the TOBI 24 is complete, it is removed from the additive manufacturing system (e.g., from the DMLF system 200). The completed TOBI may undergo finishing treatments. Finishing treatments may include, for example, aging, annealing, quenching, peening, polishing, hot isostatic pressing (HIP), or coatings. For example, during a HIP process, an encapsulation layer is applied to the article and pressure and heat are applied to remove or reduce any porosity and cracks internal to or on the surface of the component. Furthermore, as noted above with regard to FIG. 7B, the metering section of the TOBI 24 may be drilled and/or reamed to a final specification for the particular cooling air 22 flow requirements of a given implementation.

Additively manufacturing the TOBI 24 as described above with regard to FIG. 10, in the configuration of FIGS. 3-9, provides an additional structural and weight advantage that is not known in the prior art. Namely, the cooling airflow passages 26 can be additively manufactured without the need for any support structure. In contrast, common shapes like circles, ellipses, and slots need structural support to stop the top face above the open cavity from sagging when being additively manufactured. The pentagonal-shaped and triangular-shaped passages 26 having the "apex" opposite the base as described above with regard to FIGS. 4 and 5 do not need supports, thus eliminating the need for additional post-process machining, reducing metal powder consumption, and reducing overall weight of the TOBI system 24.

Accordingly, the present disclosure has provided TOBI systems that have improved cooling airflow passage designs that reduce the potential for airflow separation, and thus increase the $C_d$. The present disclosure has also described advanced manufacturing methods that allow for the efficient and cost-effective production of these TOBI cooling airflow passage designs.

In this Detailed Description, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined as such. The sequence of the text with regard to additive manufacturing methods or processes does not imply that process steps must be performed in a temporal or logical order according to such sequence unless it is specifically defined as such. The process steps may be interchanged in any order without departing from the scope of the present disclosure as long as such an interchange does not contradict the claim language and is not logically nonsensical.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A tangential on-board injector (TOBI) system comprising:
   an annulus, wherein the annulus is configured about an axis of rotation; and
   a plurality of cooling airflow passages disposed about the annulus, wherein each cooling airflow passage of the plurality of cooling airflow passages comprises:
      an inlet opening having an inlet cross-section of exactly five sides and exactly five interior angles, the inlet opening having an inlet cross-sectional area, wherein a base side of the inlet cross-section is oriented in a tangential direction with regard to the axis of rotation, and wherein the inlet cross-section is provided in a cathedral configuration such that two of the five interior angles connected with the base side and a third of the five interior angles opposite the base side are each about 90 degrees, the remaining two of the five interior angles being each about 135 degrees, and
      an outlet opening having an outlet cross-section and an outlet cross-sectional area, wherein the inlet cross-sectional area is greater in magnitude than the outlet cross-sectional area.

2. The TOBI system of claim 1, wherein the inlet cross-section defines a normal angle that is oriented substantially in an axial direction with regard to the axis of rotation and in a radial direction with regard to the axis of rotation, but not substantially in a tangential direction with regard to the axis of rotation.

3. The TOBI system of claim 2, wherein the outlet cross-section defines a normal angle that is oriented substantially in the tangential direction, but not substantially in either the axial direction or the radial direction.

4. The TOBI system of claim 1, wherein the outlet cross-section defines a normal angle that is oriented substantially in a tangential direction with regard to the axis of rotation, but not substantially in either an axial direction with regard to the axis of rotation or a radial direction with regard to the axis of rotation.

5. The TOBI system of claim 1, wherein the outlet cross-section has the same number of sides and interior angles as the inlet cross-section.

6. The TOBI system of claim 1, wherein the outlet cross-section has a circular configuration.

7. The TOBI system of claim 6, wherein each cooling airflow passage of the plurality of cooling airflow passages further comprises a transition zone between the inlet opening and the outlet opening, and wherein the transition zone includes cross-sectional configurations that transition in a continuous manner from the inlet cross-section to the circular outlet cross-section by one or more of: (1) smoothing/widening of the interior angles and (2) curving of the sides.

8. The TOBI system of claim 1, wherein an edge of the inlet opening is characterized as having sidewalls of opposite parallel surfaces connected together by an end of about 180 degree curvature.

9. The TOBI system of claim 1, wherein an edge of the inlet opening is characterized as having sidewalls that curve outwardly to angles of approximately 80-100 degrees with respect to a normal angle defined by the inlet cross-section.

10. A method for manufacturing a tangential on-board injector (TOBI) system comprising the steps of:
  creating or supplying a 3-dimensional design of the TOBI system, wherein the 3-dimensional design is characterized as comprising:
    an annulus, wherein the annulus is configured about an axis of rotation; and
    a plurality of cooling airflow passages disposed about the annulus, wherein each cooling airflow passage of the plurality of cooling airflow passages comprises:
      an inlet opening having an inlet cross-section of exactly five sides and exactly five interior angles, the inlet opening having an inlet cross-sectional area, wherein a base side of the inlet cross-section is oriented in a tangential direction with regard to the axis of rotation, and wherein the inlet cross-section is provided in a cathedral configuration such that two of the five interior angles connected with the base side and a third of the five interior angles opposite the base side are each about 90 degrees, the remaining two of the five interior angles being each about 135 degrees, and
      an outlet opening having an outlet cross-section and an outlet cross-sectional area, wherein the inlet cross-sectional area is greater in magnitude than the outlet cross-sectional area, and wherein the outlet cross-section has the same number of sides and interior angles as the inlet cross-section; and
  using an additive manufacturing process, manufacturing the TOBI system in accordance with the 3-dimensional design.

11. The method of claim 10, wherein the additive manufacturing process comprises direct metal laser sintering or direct metal laser fusion (DMLS or DMLF).

12. The method of claim 10, further comprising the step of, after the additive manufacturing process, inserting a machining tool into the outlet opening and drilling and/or reaming a metering area of circular cross-section upstream from the outlet opening of each cooling airflow passage of the plurality of cooling airflow passages.

13. The method of claim 10, wherein no machining processes are performed to alter the outlet cross-section after the additive manufacturing process.

\* \* \* \* \*